Patented Oct. 17, 1950

2,526,232

UNITED STATES PATENT OFFICE 2,526,232

SUBSTITUTED HYDANTOINS AND METHODS FOR OBTAINING THE SAME

Henry R. Henze, Austin, Tex., assignor to Parke, Davis & Company, Detroit, Mich., a corporation of Michigan No Drawing. Application October 21, 1946, Serial No. 704,795

12 Claims. (Cl. 260—286)

The invention relates to new hydantoin derivatives and methods for obtaining the same. More particularly, the invention relates to 5,5-disubstituted hydantoins where one of the two substituents at the 5-position of the hydantoin ring system is an aryl radical and the other is a quinolyl or isoquinolyl radical attached by way of one of its ring carbon atoms to the 5-position of the hydantoin. The new compounds of the invention are 5-aryl-5-quinolyl-substituted and 5-aryl-5-isoquinolyl-substituted hydantoins having the general formula,

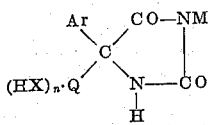

where Q is a quinolyl or isoquinolyl radical attached to the 5-position of the hydantoin ring system by way of a ring carbon atom of said heterocyclic radical, Ar is an aryl radical such as phenyl, naphthyl, tolyl, diphenyl, alkyl substituted phenyl and the like, M is a member of the class consisting of hydrogen, alkali metals, and alkaline earth metals, X is an anion of an organic or inorganic acid which forms a non-toxic soluble salt with the free base of said 5-aryl-5-quinolyl-(and isoquinolyl-)-substituted hydantoins and $n$ is 0 or 1, being always 0 when M is alkali metal or alkaline earth metal and 0 or 1 when M is hydrogen. Many of the new compounds have anticonvulsant activity and they also serve as intermediates for the preparation of other quinolyl and isoquinolyl compounds.

I prefer to prepare the compounds of the invention by reacting an aryl quinolyl or an aryl isoquinolyl ketone of formula,

where Ar and Q have the significance given above, with a system consisting of a soluble cyanide, ammonia, and carbon dioxide in the presence of an inert organic solvent or suspending agent and water, said water being present at the start of or during the reaction.

The reaction can be carried out at temperatures between the lower limit at which appreciable reaction occurs and the upper limit at which considerable decomposition of hydantoin reaction product begins to occur. The optimum temperatures and times of heating for a given combination of reactants will vary, but can be readily determined by experiment. Ordinarily, temperatures between about 50° C. and 150° C. will suffice to give satisfactory yields of hydantoins. Times of heating may vary from a few hours to a day or more.

The reactants can be used at atmospheric or higher pressures, depending upon the volatilities of the reactants and the inert organic solvents or suspending agents used, as well as the temperatures employed. If higher boiling organic solvents and suspending agents are used, one can use higher temperatures without employing pressures above atmospheric. However, when using hydrogen cyanide as the water soluble cyanide, I prefer to use a closed system and in that case either atmospheric or higher pressure may be used.

Instead of using carbon dioxide and ammonia in gaseous form, one can use ammonium carbonate or like combination which is equivalent to $CO_2$ and $NH_3$ under the conditions of the reaction. For example, instead of using sodium cyanide or hydrogen cyanide under pressure of ammonia and carbon dioxide gases, one can employ ammonium cyanide and $CO_2$ or ammonium cyanide and ammonium carbonate at atmospheric or higher pressures, whichever is preferred for a given combination of materials and conditions.

The invention may be illustrated by the following examples, but is not limited to the exact materials, conditions, times, temperatures and the like which are given therein for purposes of illustration.

*Example 1.*—9.2 grams (0.039 mole) of phenyl 4-quinolyl ketone and 3.8 grams of potassium cyanide are dissolved in 150 grams of fused acetamide. The solution is placed in a monel metal bomb and 13.1 gram of ammonium carbonate added. The bomb is quickly closed and heated for 24 hours in an oven regulated at 110° C. When the bomb is cooled and opened, 300 cc. of water are added and the mixture heated to hydrolyze the acetamide. The resulting suspension is neutralized with hydrochloric acid and the substituted hydantoin product removed by filtration. The precipitate is washed off on the filter with water and then dissolved in dilute alkali and unchanged ketone starting material extracted therefrom by ether. The hydantoin is then reprecipitated from the ether extracted alkaline solution by means of glacial acetic acid. The precipitate is then washed with water and dried. It is next dissolved in alcohol and reprecipitated by adding water. After filtering and drying the precipitate it is a light tan solid melting at 176–178° C. (with decomposition).

*Analysis for* $C_{18}H_{15}N_3O_3$ (*monohydrate of 5-phenyl-5-[4-quinolyl] hydantoin*).—Calculated: C, 67.28; H, 4.71; N, 13.08. Found: C, 67.54; H, 4.72; N, 12.90.

The free base hydantoin of this example may be represented by the formula,

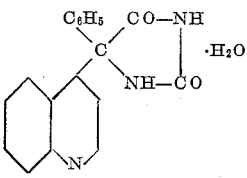

Its hydrochloride or sulfate or lactate, citrate, benzoate or glycerophosphate or like non-toxic organic or inorganic water soluble salt can be made merely be reacting this free base with an equivalent amount of the corresponding acid by known methods for making acid-addition salts of organic bases. These acid addition salts, such as those of the hydantoin of this example mentioned above and analogous salts of the free bases described in the subsequent examples, can be made up in greater concentrations, in aqueous solution and are more stable than the corresponding alkali metal or alkaline earth metal salts made by treating the free base with an exactly equivalent amount of alkali metal or alkaline earth metal hydroxide. Furthermore, the metal salts, where M of the general formula is alkali metal or alkaline earth metal, are not suitable for intravenous injection, whereas the acid-addition salts are.

*Example 2.*—The phenyl 5-quinolyl ketone starting material can be made by reacting 6.33 grams of magnesium with 41 grams of bromobenzene in anhydrous ether and adding thereto at a rate to maintain constant reflux 20 grams of 5-cyano quinoline dissolved in 250 cc. of absolute ether. After adding the cyano quinoline refluxing is continued for two additional hours. The ether is then distilled off and the brown amorphous product hydrolyzed by adding 100 cc. of 6 N hydrochloric acid and refluxing for two hours. The aqueous phase is made alkaline with ammonium hydroxide and the ketone product extracted with ether and dried over anhydrous sodium sulfate. After distilling off the ether, the residue is fractionated and gives a viscous yellow oil which is collected from the fraction boiling at 218 to 221° C. at 3 mm. The ketone soon becomes crystalline and melts at 118–119° C. following 3 recrystallizations from ethyl alcohol. It exists in the form of pale yellow needles.

To 9 grams of phenyl-5-quinolyl ketone thus prepared there are added 4.3 grams of potassium cyanide, 14 grams of ammonium carbonate, 150 cc. of 95% alcohol and 50 cc. of water and the mixture heated at 110° C. for 18 hours. The contents of the bomb are then acidified with hydrochloric acid, the alcohol partially evaporated, and the residual liquor made alkaline with hydroxide, extracted with ether, treated with "norite" decolorizing carbon in the cold, filtered and reacidified with hydrochloric acid. The desired hydantoin separates upon reacidification and is filtered off and dried thoroughly. It is finally purified by solution in absolute alcohol and addition of 10 volumes of ether, filtration and drying under a vacuum to give 5-phenyl-5-(5-quinolyl) hydantoin monohydrate analyzing correctly for $$C_{18}H_{13}N_3O_2 \cdot H_2O$$

The various metal and acid-addition salts of this product can be prepared as described for the hydantoin of Example 1.

*Example 3.*—A Grignard reagent is formed from 7.25 grams of magnesium and 47 grams of bromobenzene in anhydrous ether. To this there is added at a rate sufficient to maintain constant reflux a solution of 23 grams of 6-cyanoquinoline in 200 cc. of anhydrous benzene. It is then refluxed two hours and hydrolyzed by addition of 6 N hydrochloric acid. The aqueous phase is neutralized with ammonium hydroxide chilled, and a gummy red precipitate removed by filtration. It is then dissolved in ether, dried over anhydrous sodium sulfate and after removing ether fractionated to yield the desired ketone boiling at 215–217° C. at 3 mm. When it cools it solidifies and can be crystallized from ethyl alcohol as five yellow needles. The melting point of this phenyl 6-quinolyl ketone after 3 recrystallizations is 104 to 106° C. Its semicarbozone melts at 186–188° C.

A mixture of 5.5 grams of phenyl 6-quinolyl ketone, 2.6 grams of potassium cyanide and 8.3 grams of ammonium carbonate are dissolved in 100 cc. of 95% alcohol and 50 cc. of water and heated in a bomb for 20 hours at 110° C. The bomb is cooled, opened and the contents acidified with hydrochloric acid, partially evaporated, diluted and made basic with sodium hydroxide. It is then extracted with ether and filtered to remove any tarry material, the filtrate reacidified with hydrochloric acid, the precipitated hydantoin filtered and dessicated. The dried hydantoin is dissolved in absolute alcohol, filtered, chilled, and refiltered and then partially evaporated. Upon standing over night in the ice chest, the hydantoin precipitates as yellow needles which can be recrystallized from absolute alcohol. The dry crystals of 5-phenyl-5-(6-quinolyl) hydantoin melt at 245 to 245.5° C.

*Example 4.*—A Grignard reagent is prepared from 5.8 grams of magnesium and 37.7 grams of bromobenzene in ether. To this phenyl magnesium bromide product there is added at a rate to maintain constant reflux a solution of 18.3 grams of 7-cyanoquinoline in 200 cc. of dry benzene and 100 cc. of absolute ether. The reaction product is then worked up as given for the Grignard reaction products of Examples 1, 2 and 3. Fractionation of the ketone product gives a ketone collected between 219 and 223° C. at 3 mm. which soon solidifies when cooled and can be recrystallized from ethyl alcohol to give pale yellow needles of phenyl 7-quinolyl ketone of melting point 129–130.5° C. Its oxime melts at 216–217° C.

To a solution of 9 grams of phenyl-7-quinolyl ketone, 4.3 grams of potassium cyanide in 150 cc. of 95% alcohol and 50 cc. of water there are added 14 grams of ammonium carbonate and the reaction mixture heated at 110° C. for 20 hours. The bomb contents are cooled, acidified with hydrochloric acid, an additional 200 cc. of water added and the liquor partially evaporated. The solution is then made neutral with sodium hydroxide, the precipitated hydantoin filtered off and redissolved in sodium hydroxide solution, ether extracted, mixed with "norite" decolorizing charcoal, filtered, and the hydantoin precipitated from the filtrate by adding hydrochloric acid. The hydantoin is filtered off, washed and dried over calcium chloride. This product is extracted with absolute alcohol to remove it from any inorganic residue and the alcoholic extract precipitated by adding absolute ether. The mixture is placed in an ice chest overnite and filtered to remove any further insoluble or inorganic impurities. It is then evaporated with periodic cooling in order to obtain crystals if any should happen to separate out. Although this sometimes occurs, it is usually more practical to evaporate the solution to dryness and keep it in a vacuum dessicator for a few days. The pure 5-phenyl-5-(7-quinolyl) hydantoin thus obtained shrinks at 105° C. and melts sharply at 229° C.

Analysis for $C_{18}H_{13}O_2N_3 \cdot H_2O$;
Found {C, 67.28; H, 4.73; N, 13.08
{C, 67.32; H, 4.98; N, 13.22.

*Example 5.*—9.2 grams of phenyl-1-isoquinolyl ketone prepared for example as described by Kaufman et al., Berichte, 46, 2929–2935 (Chem. Abstracts, vol. 8, page 117 (1914)), and 3.8 grams of potassium cyanide are dissolved in 150 grams of fused acetamide. The solution is placed in a monel metal bomb and 13.1 grams of ammonium carbonate added. The bomb is quickly closed and heated for 24 hours in an oven at 110° C. The bomb is then cooled and opened. 300 cc. of water are added to the contents of the bomb and the mixture heated to hydrolyze the acetamide. The resulting suspension is neutralized with hydrochloric acid and the substituted hydantoin product removed by filtration. The precipitate is washed off on the filter with water and then dissolved in dilute alkali and unchanged ketone starting material extracted therefrom by ether. The hydantoin is then reprecipitated from the ether extracted alkaline solution by means of glacial acetic acid. The precipitate is washed with water and dried. It is then dissolved in alcohol and reprecipitated by adding water. After filtering and drying, the pure 5-phenyl-5-(1-isoquinolyl) hydantoin is obtained. It can be treated with one equivalent of alkali or alkaline earth metal hydroxide to obtain its metal salts or it can be treated with one equivalent of an organic or inorganic acid, such as hydrochloric, sulfuric or lactic acids, to form non-toxic acid-addition salts.

*Example 6.*—104 grams of freshly distilled o-chloroaniline, 240 grams of glycerol, previously heated to 180° C. for dehydration, and 116 grams of arsenic acid are mixed in a 1 liter round bottom flask. To the mixture there is added 220 grams (120 cc.) of concentrated sulfuric acid slowly with stirring. Much heat is generated. The flask is then heated in an oil bath at 130–133° C. for 6 to 8 hours. After cooling to room temperature, the mixture is made alkaline with sodium hydroxide solution, cooled again and extracted with ether. The extract is dried overnight on caustic, filtered and fractionated. The fraction boiling at 126 to 128° C. at 3 mm. pressure is 8-chloroquinoline.

To 41.4 grams of 8-chloroquinoline in a 250 cc. Claisen flask with wide side-arm there is added 30 grams of anhydrous cuprous cyanide. The flask is heated with a luminous flame until the mixture fuses and assumes a black color. At this point the pressure in the flask is lowered to 40 mm. and the nitrile is distilled as rapidly as possible. Up to about 95% yield of the crude nitrile are obtained. After recrystallization from alcohol, the 8-cyanoquinoline melts at 82 to 83° C.

A solution of phenyl magnesium bromide is prepared by interaction of 59.5 grams of dry bromobenzene in 150 cc. of anhydrous ether and 7.8 grams of magnesium turnings. The solution is treated with 29.3 grams of 8-cyanoquinoline dissolved in 150 cc. of dry benzene over a period of 90 minutes. Heat is liberated, but the mixture is refluxed an additional hour. It is necessary to add 100 cc. of concentrated hydrochloric acid and 100 cc. of water and to boil for about 90 minutes to hydrolyze the ketimine. Most of the ether is permitted to volatilize before removing the aqueous layer, neutralizing this solution with sodium carbonate solution and extracting the gummy brown material with ether. The extract is dried over sodium sulfate (anhydrous), filtered and fractionated. The phenyl-8-quinolyl ketone product is collected at 212 to 215° C. under 3 mm. pressure. After one recrystallization from ethyl alcohol the melting point is 90° C. Three recrystallizations give a pure phenyl-8-quinolyl ketone of melting point 92 to 94° C.

200 grams of acetamide are fused in a glass lined bomb and to the melt there are added 9 grams of potassium cyanide and 18.3 grams of phenyl-8-quinolyl ketone. When solution is complete, 28.8 grams of ammonium carbonate cubes are added and the bomb closed at once. The bomb and contents are heated at 140–145° C. for 8 hours, cooled and the contents poured into 500 cc. of water. The aqueous solution is acidified with hydrochloric acid under the hood and the crude hydantoin which separates is filtered off, dissolved in about 200 cc. of 20% hydrochloric acid solution and finally treated with "Norite" decolorizing charcoal and filtered. The slightly yellow filtrate is made basic with dilute sodium hydroxide solution and then extracted with ether to recover 3.12 grams of unreacted ketone. The ether extracted solution is neutralized exactly with hydrochloric acid to precipitate the hydantoin compound as a flocculent yellow solid. It is leached with absolute alcohol to free it from any inorganic salts, the solution in alcohol filtered and then concentrated to yield a light brown solid. It is twice recrystallized from absolute alcohol and gives a product melting at 247.5 to 249.5° C. This product is 5-phenyl-5-(8-quinolyl) hydantoin.

It will be apparent from the description that the invention includes both quinolyl compounds of the formula,

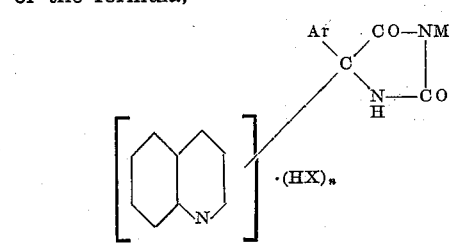

and isoquinolyl compounds of formula,

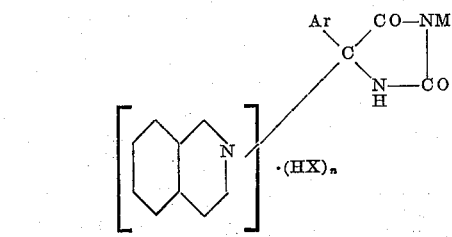

where Ar, M, X and $n$ have the significance already given. The preferred compounds from the standpoint of therapeutic value are those where Ar is phenyl, M is hydrogen and $n$ is 1. Aqueous solutions of the acid-addition salts can be made up in rather high concentrations suitable for injection, even intravenously; e. g. the HCl salt of hydantoin, Example 6.

What I claim is:

1. Aryl heterocyclic hydantoin compounds of formula,

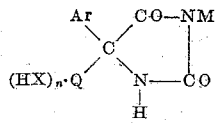

where Q is a benzpyridyl radical attached to the 5-position carbon atom of the hydantoin ring by way of a ring carbon atom of said radical, Ar is an aryl radical, M is a member of the class consisting of hydrogen, alkali metals and alkaline earth metals, X is an anion of an acid which forms an non-toxic soluble acid-addition salt with the free base of said hydantoin, and $n$ has one of the values 0 and 1, being always 0 when M is one of said metals and being one of the values 0 and 1 when M is hydrogen.

2. 5-phenyl-5-(8-quinolyl) hydantoin.

3. An injectable aqueous solution of 5-phenyl-5-(8-quinolyl) hydantoin acid-addition salt.

4. An injectable aqueous solution of the hydrochloride of 5-phenyl-5-(8-quinolyl) hydantoin.

5. Process for obtaining 5-aryl-5-benzpyridyl hydantoins which comprises reacting a ketone of formula,

where Ar is aryl and Q is a benzpyridyl radical attached to the ketone carbon atom by way of a ring carbon atom of said radical, with a system consisting of a soluble cyanide, ammonia and carbon dioxide in the presence of an inert organic solvent and water.

6. Process for obtaining 5-phenyl-5-quinolyl hydantoins which comprises reacting a ketone of formula,

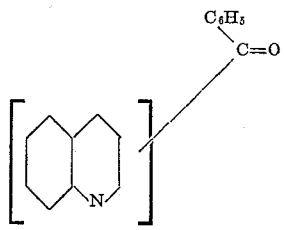

with a system consisting of a soluble cyanide, ammonia and carbon dioxide in the presence of an inert organic solvent and water.

7. An acid addition salt of 5-phenyl-5-(8-quinolyl) hydantoin.

8. The hydrochloride salt of 5-phenyl-5-(8-quinolyl) hydantoin.

9. A 5-aryl-5-benzpyridyl hydantoin.

10. An acid addition salt of a 5-aryl-5-benzpyridyl hydantoin.

11. A 5-phenyl-5-quinolyl hydantoin.

12. An acid addition salt of a 5-phenyl-5-quinolyl hydantoin.

HENRY R. HENZE.

REFERENCES CITED

The following references are of record in the file of this patent:

UNITED STATES PATENTS

| Number | Name | Date |
|---|---|---|
| 2,327,890 | Henze | Aug. 24, 1943 |
| 2,391,799 | Rogers | Dec. 25, 1945 |
| 2,404,509 | Long | July 23, 1946 |
| 2,404,510 | Long | July 23, 1946 |

FOREIGN PATENTS

| Number | Country | Date |
|---|---|---|
| 566,094 | Germany | Dec. 14, 1932 |
| 602,218 | Germany | Sept. 3, 1934 |

OTHER REFERENCES

Sidgwick: "Organic Chemistry of Nitrogen" (Oxford University Press, 1937); pp. 522, 523 and 549.

Henze et al.: "J. Am. Chem. Soc.," vol. 64, pp. 522–523 (1942).

Linsker et al.: "J. Am. Chem. Soc.," vol. 68, pp. 947–948 (June 1946).